United States Patent Office 2,783,234
Patented Feb. 26, 1957

2,783,234

2[β-(3',4'-DIMETHOXYPHENYL)ETHYL]-4,6,7-TRIMETHOXYQUINOLINE

Kenneth N. Campbell, South Bend, Ind., assignor to Miles Laboratories, Inc., Elkhart, Ind., a corporation of Indiana No Drawing. Application May 31, 1952,
Serial No. 291,071

1 Claim. (Cl. 260—289)

This invention relates to substituted 2-(β-aryl) ethyl-quinolines and more particularly to polymethoxy 2-phenylethylquinolines.

The compounds of my invention are useful as pharmaceuticals, having for example, therapeutic properties as anti-fibrillatory agents.

A general method for the preparation of the present compounds involves the condensation of a 2-methyl-quinoline with an aromatic aldehyde to form a styryl quinoline followed by hydrogenation of the olefinic bond as follows:

Q—CH₃+Ar—CHO→Q=CH—AR  Q—CH₂—CH₂—Ar

The invention will be illustrated in greater detail by means of the following specific examples in which representative methoxy quinolines are reacted with aromatic aldehydes to produce styryl quinolines and the styryl quinolines hydrogenated to give the desired polymethoxy 2-phenylethylquinolines. It is to be understood that the examples are intended to illustrate the invention and are not in limitation thereof.

EXAMPLE I.—2-(β-4-METHOXY PHENYL ETHYL-4,6-DIMETHOXY QUINOLINE

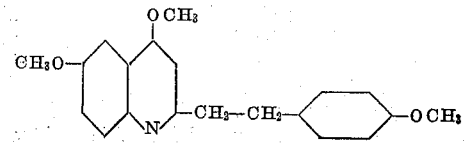

A. *Preparation of 2-(4'-methoxy) styryl-4,6-dimethoxy-quinoline.—High melting form*

Ten grams (0.05 mole) of 4,6-dimethoxyquinaldine, 7 grams (0.05 mole) of p-anisic aldehyde and 30 ml. (0.25 mole) of acetic anhydride were mixed together and refluxed for twenty-four hours. The solution was allowed to cool to room temperature and then poured onto about 150 grams of cracked ice, contained in a beaker. The mixture was stirred for five minutes and then made slightly alkaline by the addition of 10% aqueous sodium hydroxide solution. A black, viscous oil settled to the bottom of the beaker. The supernatant aqueous phase was decanted off, and the oil was taken up in acetone. A considerable portion of the solvent was removed by evaporation and the residue was cooled in an ice bath. A light green micro-crystalline solid separated from solution and was isolated by filtration. The mother liquor was concentrated further, and upon cooling a second crop of crystalline material was obtained. This, in turn, was isolated by filtration and the process repeated a third time, yielding still another crop of material. These solid portions were combined and dried over calcium chloride, in vacuo. The crude product weighed 7.5 grams, or 47% of the theoretical amount, and melted at 271–276° with decomposition. Recrystallization from acetone yielded a light green microcrystalline solid melting at 280–283° with decomposition.

The material was recrystallized again, this time from a 1:1 mixture of n-propanol and chloroform, using decolorizing carbon. After drying the greenish-yellow product melted at 283–285° C. with decomposition.

B. *Preparation of 2-(4'-methoxy) styryl-4,6-dimethoxy-quinoline.—Low melting form*

Five grams (0.025 mole) of 4,6-dimethoxyquinaldine, 3.5 grams (0.025 mole) of p-anisic aldehyde and 1.6 grams (0.012 mole) of fused zinc chloride (pulverized) were mixed together in a 100-ml. round bottom flask. The mixture was heated on a hot water bath for a period of three hours, during which time the viscosity increased only slightly. The flask was then placed in an oil bath, maintained at a temperature of 140°, and the mixture was heated for an additional two-hour period, during which time solidification occurred.

Twenty-five milliliters of water and 75 ml. of chloroform were added to the reaction flask. The mixture was warmed gently and then shaken vigorously, in order to effect solution of the organic material in the chloroform and the inorganic material in the aqueous phase. The chloroform layer assumed a deep red color. The chloroform layer, which contained some suspended solid material, was drawn off and filtered. The filtrate was concentrated to about 25 ml., and upon cooling to room temperature, a copious quantity of bright yellow solid separated out of solution. This was isolated by filtration and dried, in vacuo, over anhydrous calcium chloride. The crude material weighed 2.0 grams and melted at 170–178°. Further concentration of the mother liquor yielded an additional 0.8 gram of product melting at 170–177°. The over-all yield of crude product (2.8 grams) represented 35% of the theoretical amount.

Recrystallization from 95% ethanol yielded a bright yellow crystalline solid melting at 180–182°.

*Analysis.*—Calc'd for C₂₀H₁₉NO₃: C, 74.74; H, 5.96; N, 4.36. Found: C, 74.55; H, 6.06; N, 4.40.

C. *Hydrogenation of 2-(4'-methoxy) styryl-4,6-dimethoxyquinoline.—High melting form*

The styryl quinoline from A above was converted to the hydrochloride salt in accordance with the procedure described in Ber., 57B, 1243–1251 (1924). One and six-tenths grams (0.005 mole) of the high melting 2-(4'-methoxy) styryl-4,6-dimethoxyquinoline hydrochloride, 30 ml. of glacial acetic acid and 30 ml. of distilled water were mixed together in a 100-ml. capacity hydrogenation flask.

The styryl hydrochloride dissolved only partially in the acetic acid-water mixture. Two hundred milligrams (0.20 gram) of palladium-charcoal catalyst (10%) was added, and the flask was then flushed with hydrogen three times to dispel the air, then filled with hydrogen. Shaking was then commenced and continued without interruption until the theoretical (calculated) volume of hydrogen had been absorbed.

The data in the following table were obtained during the course of the above hydrogenation.

TABLE A.—HYDROGENATION OF 2-(4'-METHOXY) STYRYL-4,6-DIMETHOXYQUINOLINE

| Time (min.): | Vol. of H₂ abs. (ml.) |
|---|---|
| 0 (start) | 0 |
| 15 | 25 |
| 30 | 44 |
| 45 | 60 |
| 60 | 76 |
| 75 | 88 |
| 90 | 98 |
| 105 | 105 |
| 120 | 112 |
| 150 | 124 |
| 165 | 126 |
| 180 | 129 |
| 195 | 129 |
| 210 | ¹130 |

¹ Stopped.

Total H₂ abs.—130 ml.
Calculated H₂ abs.—131 ml.

The flask was disconnected from the apparatus and the contents were filtered to remove the catalyst. A 20% aqueous solution of sodium hydroxide was added to the filtrate in small increments until the solution became just alkaline to litmus. A copious quantity of solid material precipitated at this point. The mixture was transferred to a separatory funnel and extracted with ether, first with one 100-ml. portion, then with two 50-ml. portions. These extracts were combined and dried using anhydrous magnesium sulfate. After filtration to remove the drying agent, the ether was removed completely by evaporation on a hot water bath at reduced pressure (water aspirator). The solid residue weighed 0.6 gram and melted at 137–141°. This amount represented 40% of the theoretical yield of 2-($\beta$-4'-methoxyphenyl) ethyl-4,6-dimethoxyquinoline.

The crude product was recrystallized from a mixture of high boiling petroleum ether (Skellysolve L) and chloroform, using decolorizing carbon (Norit A). The colorless crystalline solid melted at 140–143°. A second recrystallization raised the M. P. to 144–146°. This product was not analyzed, since its melting point was identical with that of the product obtained upon hydrogenation of the lower melting styryl, which analyzed correctly (see section B, below). The melting point of the latter showed no depression upon admixture with this product:

| | M. P., ° |
|---|---|
| Product from high melting styryl | 144–146 |
| Product from lower melting styryl | 146.5–148 |
| Mixture of both products | 146–148 |

B. *From the lower melting styryl*

2-(4'-methoxy) styryl-4,6-dimethoxyquinoline (M. P. 180–182°), 1.6 grams (0.005 mole) in the form of the free base was added to a mixture of 60 ml. of ethyl acetate and 5 ml. of glacial acetic acid. The compound dissolved rapidly and completely. The solution was transferred to a hydrogenation flask as described above, 0.20 gram of palladium-charcoal catalyst (10%) was added, and the flask then swept with hydrogen and the contents shaken, in contact with hydrogen, until the theoretical quantity had been absorbed.

The mixture was filtered to remove the suspended catalyst. The clear filtrate was made slightly alkaline to universal indicator paper by adding alcoholic potassium hydroxide (saturated) in small amounts until the desired degree of alkalinity was attained. The solution was then concentrated to approximately 25 ml. by evaporation over a steam cone. An equal volume of 95% ethanol was added, then water, dropwise, until precipitation of the product was complete. The product was then isolated by filtration, washed several times with water and dried over calcium chloride, in vacuo. The crude product weighed 1.4 grams and melted at 145–148°. The yield represented 88% of the theoretical amount.

Recrystallization from 80% ethanol, using decolorizing carbon (Norit A) yielded 1.0 gram of a greenish yellow crystalline solid melting at 146.5–148°.

*Analysis.*—Calc'd for $C_{20}H_{21}NO_3$: C, 74.28; H, 6.55; N, 4.33. Found: C, 74.42; H, 6.32; N, 4.39.

EXAMPLE II.—2-($\beta$-3'4'-METHYLENEDIOXYPHENYL)ETHYL-4,6-DIMETHOXYQUINOLINE

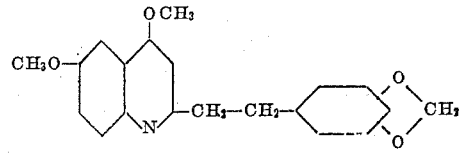

*Preparation of 2-(3'4'-methylenedioxy)styryl-4,6-dimethoxyquinoline*

4,6-dimethoxyquinaldine (10.0 grams, 0.05 mole), piperonal (7.0 grams, 0.05 mole) and 4.0 grams of fused zinc chloride (pulverized) were mixed together in a 200 ml. round bottom flask which was open to the atmosphere. The mixture was heated at 125–130° by means of an oil bath. The viscosity of the mixture increased gradually over a three-hour period and then complete solidification occurred. The heating was continued for an additional twelve hours, until the evolution of water vapor was no longer observable.

One hundred milliliters of 95% methanol was added to the reaction flask, which was then fitted with a water cooled reflux condenser. The mixture was heated until gentle refluxing commenced, at which point saturated alcoholic potassium hydroxide solution was added until mild alkalinity to universal indicator was reached. The mixture was allowed to reflux for approximately one hour and the hot mixture then filtered. The insoluble material was returned to the reaction flask and 100 ml. of fresh alcohol added, the mixture again being rendered mildly alkaline by the addition of alcoholic potassium hydroxide. Heat was applied once again and the mixture allowed to reflux for one hour. The mixture then filtered and the insoluble residue discarded. The filtrates were combined and concentrated by evaporation on a steam cone. Upon cooling, a crop of crude, brown solid material separated and was isolated by filtration. Further concentration of the mother liquor, followed by cooling, yielded a second crop of solid which was removed by filtration and combined with the first crop. After drying, in vacuo, over calcium chloride, the crude product weighed 5.5 grams or 33% of the theoretical yield.

The crude product was dissolved in hot ethyl acetate, filtered, and the small amount of insoluble residue discarded. The filtrate was cooled in an ice bath and yielded a second crop of yellow crystalline material. Concentration of the mother liquor, followed by cooling, yielded a second crop of bright yellow crystalline material, which was combined with the first. After drying, the recrystallized material weighed 3.5 grams and melted at 186–188°.

A small portion of the above product was recrystallized again from ethyl acetate, using decolorizing carbon, and a third time from a mixture of ethyl acetate and high boiling petroleum ether (Skellysolve L). The final product was very light yellow in color and melted at 187–188.5°.

*Analysis.*—Calc'd for $C_{20}H_{17}NO_4$: C, 71.64; H, 5.11; N, 4.18. Found: C, 71.66; H, 5.34; N, 4.02.

A. *Hydrogenation of 2-(3'4'-methylenedioxy)-styryl-4,6-dimethoxyquinoline*

One and sixty-seven hundredths grams (0.005 mole) of 2-(3'4'-methylenedioxy) styryl-4,6-dimethoxyquinoline was added to 30 ml. of ethyl acetate contained in the atmospheric pressure hydrogenation flask, described previously. Five milliliters of glacial acetic acid was then added, which converted the quinoline to the acetate salt. Upon addition of the acetic acid, the styryl quinoline dissolved rapidly and completely; however, after several minutes a copious quantity of bright yellow crystalline solid precipitated, which redissolved on gentle warming of the mixture. Two hundred milligrams of palladium on charcoal (10%) catalyst was added, then an additional 30 ml. of ethyl acetate, bringing the total volume of solvent to 65 ml. As the solution cooled to room temperature, a considerable quantity of yellow solid reprecipitated. The flask was then flushed three times with hydrogen, then filled with hydrogen. Shaking was then commenced and continued for 105 minutes. As in the previous run, hydrogen absorption did not cease at the theoretical end-point, and the shaking was discontinued shortly after the end-point was passed.

The solution in the flask was filtered to remove the catalyst, and the filtrate made slightly alkaline to universal indicator paper by adding alcoholic potassium hydroxide solution (saturated) in small increments until the desired degree of alkalinity was attained. The solution was then concentrated to approximately 50 ml. by evaporation over a steam bath, with the aid of suction. Upon cooling the solution, a copious amount of pink, crystalline material separated. This product was collected on a filter, washed with dilute alcohol (ca. 50%) and dried over calcium chloride, in vacuo. The crude product after drying weighed 3.1 grams, or 88% of the theoretical quantity, and melted at 128–130°.

Recrystallization from 95% ethanol, using decolorizing carbon, yielded a colorless solid melting at 130–131°. A second recrystallization from the same solvent did not alter the melting point.

*Analysis.*—Calc'd for $C_{20}H_{19}NO_4$: C, 71.19; H, 5.68; N, 4.15. Found: C, 71.27; H, 5.68; N, 4.39.

EXAMPLE III.—2-($\beta$-3'4'-DIMETHOXYPHENYL)-ETHYL-4,6,7-TRIMETHOXYQUINOLINE

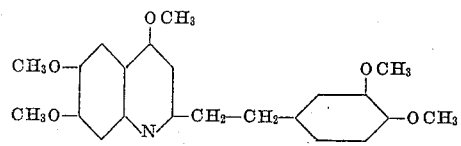

A. *Preparation of 2-(3'4'-dimethoxy)styryl-4,6,7-trimethoxyquinoline*

The preparation of the styryl compound involves the use, as an intermediate, of 4,6,7-trimethoxyquinaldine. This latter was prepared as follows:

(a) 4-hydroxy-6,7-dimethoxyquinaldine was prepared in accordance with the method described in J. Proc. Roy. Soc. N. S. Wales, 71, 242–250 (1938), and 25 grams (0.11 mole) of the crude material melting at 271–275° C. was mixed with one hundred ml. of phosphorus oxychloride in a flask and refluxed for twelve hours.

The excess phosphorus oxychloride was removed by distillation; the oily residue was poured onto 100 grams of cracked ice and saturated aqueous sodium carbonate added until the mixture became alkaline to litmus. A precipitate formed which was filtered, washed with cold water and dried in vacuo. The crude product, weighing 24.5 grams (91% of theoretical) melted at 129–132°. After three recrystallizations from 60% ethanol the compound melted at 137–138°. The product analyzed as follows: C, 60.87; H, 5.02; N, 5.67. Calculated for $C_{12}H_{12}ClNO_2$: C, 60.63; H, 5.09; N, 5.89.

(b) 7.0 grams (0.3 mole) of sodium were added to a flask containing 120 ml. of dry methanol (ice bath) and when the sodium had reacted completely (one hour) 24 grams (0.10 mole) of 4-chloro-6,7-dimethoxyquinaldine prepared as described under (a) above, was added. The mixture was heated and refluxed 48 hours.

200 ml. of water was then added to the reaction mixture resulting in precipitation of a small amount of solid. The mixture was transferred to a suction flask, and evaporated on a hot water bath. After a sufficient quantity of methanol had been removed in this fashion, a copious quantity of solid precipitated. The mixture was cooled, filtered, and the solid washed with cold water. After drying in vacuo, the crude product weighed 19.0 grams (81% theoretical) and melted at 155–157.5°. After one recrystallization from a mixture of high boiling petroleum ether and benzene, and two recrystallizations from petroleum ether alone, the resulting light yellow solid melted at 159–160°. The product analyzed as follows: C, 67.13; H, 6.62; N, 6.00. Calculated for $C_{13}H_{15}NO_3$: C, 66.93; H, 6.48; N, 6.01.

The 4,6,7-trimethoxyquinaldine, prepared as above described was then reacted with veratric aldehyde as follows:

To a 200-ml. round bottom, one-neck flask was added 11.7 grams (0.05 mole) of 4,6,7-trimethoxyquinaldine, 12.5 grams (0.075 mole) of veratric aldehyde (freshly distilled) and 4.0 grams of fused zinc chloride (pulverized). The open-necked flask was heated continuously for a period of ninety-six hours, with the temperature maintained at 105–110°. There was a gentle evolution of water vapor during the period of heating, and the mixture solidified gradually.

The orange reaction product was dissolved in 50 ml. of 95% ethanol and the mixture made mildly alkaline to universal indicator paper with alcoholic potassium hydroxide solution (saturated). A condenser was then attached to the flask and the mixture refluxed for approximately thirty minutes. The undissolved solid (zinc hydroxide) was removed by filtration. The entire residue on the filter was returned to the reaction flask and the above process repeated; the filtrate was then combined with that from the first operation. Upon cooling this combined filtrate, bright yellow solid crystallized out of solution and was isolated by filtration.

The crude product was recrystallized from a mixture of high boiling petroleum ether (Skellysolve L) and benzene. M. P. of the recrystallized product was 206–207.5° C. The product analyzed as follows: C, 68.98; H, 6.04, N, 3.93. Calculated for $C_{22}H_{23}NO_5$: C, 69.28; H, 6.08; N, 3.67.

B. *Hydrogenation of 2-(3'4'-dimethoxy)styryl-4,6,7-trimethoxyquinoline*

One and nine-tenths grams (0.005 mole) of 2-(3'4'-dimethoxy)styryl-4,6,7-trimethoxyquinoline was dissolved (incompletely) in 30 ml. of ethyl acetate. Ten milliliters of glacial acetic acid was added. The acetate salt was in this case, less soluble in ethyl acetate than the free base, and a considerable quantity of the material precipitated out in the form of brilliant orange crystals. Palladized charcoal (10%) catalyst, 0.20 gram, was added to the mixture, the flask containing the mixture was swept with hydrogen and the solution shaken in contact with hydrogen as previously described.

The hydrogenation continued at a steady rate, after the contents of the flask were gently heated, until the theoretical amount had been absorbed (22 hours).

The mixture was filtered to remove the suspended catalyst and the clear, green filtrate was rendered mildly alkaline by the addition of alcoholic potassium hydroxide solution. The solution was concentrated by evaporation on a steam cone, with the aid of suction. Upon cooling, a quantity of light yellow crystalline material came out of solution. This was isolated by filtration and dried in vacuo over calcium chloride. The crude product weighed 0.92 gram. Further concentration of the mother liquor yielded another 0.44 gram of crude product. Total yield=1.36 grams (theory=1.91 grams). The crude product melted at 147–152°. Recrystallization from a mixture of ethanol and high boiling petroleum ether (Skellysolve L) gave a light yellow crystalline material melting at 147.5–149°. A second recrystallization from Skellysolve L gave a product melting at 148–149°, and yet another recrystallization from the same solvent afforded a clean, very light yellow product which melted at 148–149.5°. The product analyzed, as follows: C, 69.17; H, 6.48; N, 4.32. Calculated for $C_{22}H_{25}NO_5$: C, 68.91; H, 6.57; N, 3.65.

Other compounds prepared in accordance with the foregoing procedure are:

2 - ($\beta$-2'-methoxyphenyl)ethyl-4,6-dimethoxyquinoline, M. P. 100–101°;

2 - ($\beta$-3'4'-dimethoxyphenyl)ethyl-4,6-dimethoxyquinoline, M. P. 122–123°;

2-($\beta$-3'4'-methylenedioxyphenyl)ethyl-4,6,7-trimethoxyquinoline, M. P. 155–156°.

I claim:

2-($\beta$-3'4'-dimethoxyphenyl)ethyl-4,6,7-trimethoxyquinoline.

References Cited in the file of this patent

Spath: Ber. 57 B, 1243–51 (1924).
Pratt: J. Chem. Soc. 127, 166–75 (1925).
Beilstein: vol. XX and XXII (1935), p. 251 (1st Ergänzungswerk).
Deulofeu: Nature, vol. 162, page 694 (1948).